US008624707B2

(12) United States Patent
Konishi et al.

(10) Patent No.: US 8,624,707 B2
(45) Date of Patent: Jan. 7, 2014

(54) DETECTION TARGET IDENTIFYING/POSITION ESTIMATING SYSTEM, ITS METHOD, AND PROGRAM

(75) Inventors: Yusuke Konishi, Tokyo (JP); Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 1192 days.

(21) Appl. No.: 12/094,527

(22) PCT Filed: Nov. 17, 2006

(86) PCT No.: PCT/JP2006/322975
§ 371 (c)(1),
(2), (4) Date: May 21, 2008

(87) PCT Pub. No.: WO2007/058301
PCT Pub. Date: May 24, 2007

(65) Prior Publication Data
US 2009/0284350 A1    Nov. 19, 2009

(30) Foreign Application Priority Data

Nov. 21, 2005 (JP) .................................. 2005-335470

(51) Int. Cl.
*G08B 5/22* (2006.01)
(52) U.S. Cl.
USPC ............ 340/8.1; 342/450; 342/451; 342/463; 340/572.1; 340/572.4
(58) Field of Classification Search
USPC .......................................... 340/1.1, 6.1, 8.1
See application file for complete search history.

(56) References Cited

U.S. PATENT DOCUMENTS

2005/0093745 A1* 5/2005 Krumm et al. ................ 342/465
2007/0008069 A1* 1/2007 Lastinger et al. ............ 340/10.1

FOREIGN PATENT DOCUMENTS

JP     04-115176      4/1992
JP     7-146366       6/1995

(Continued)

OTHER PUBLICATIONS

Ni, L.M.; Yunhao Liu; Yiu Cho Lau; Patil, A.P.; , "LANDMARC: indoor location sensing using active RFID," Pervasive Computing and Communications, 2003. (PerCom 2003). Proceedings of the First IEEE International Conference on Pervasive Computing and Communications, pp. 407-415, Mar. 23-26, 2003 doi: 10.1109/PERCOM. 2003.1192765.*

(Continued)

*Primary Examiner* — Brian Zimmerman
*Assistant Examiner* — Sara Samson
(74) *Attorney, Agent, or Firm* — Scully, Scott, Murphy & Presser P.C.

(57) ABSTRACT

Information from one or more transmitters installed in a detection object area is received. The reception feature value of when a detection object is present in a predetermined position of the detection object area is measured. A reception pattern of when the detection object is present in the predetermined position is formed. The reception pattern is compared with reference reception patterns, and the presence position corresponding to the reference reception pattern most approximate to the reception pattern is acquired from a reference reception pattern database where the presence positions of the detection object and the reference reception patterns of when the detection object is present in the presence positions are associated with one another. The presence position of the detection object is estimated according to the acquired presence position. The estimated presence position of the detection object is associated with received detection object identification information.

13 Claims, 13 Drawing Sheets

(56) References Cited

FOREIGN PATENT DOCUMENTS

| | | |
|---|---|---|
| JP | 8-107583 | 4/1996 |
| JP | 10-84571 | 3/1998 |
| JP | 10-242893 | 9/1998 |
| JP | 11-282977 | 10/1999 |
| JP | 2001-229474 | 8/2001 |
| JP | 2001-307052 | 11/2001 |
| JP | 2002-64440 | 2/2002 |
| JP | 2002-148349 | 5/2002 |
| JP | 2002-170082 | 6/2002 |
| JP | 2002-236166 | 8/2002 |
| JP | 2002-259932 | 9/2002 |
| JP | 2002-329174 | 11/2002 |
| JP | 2003-58843 | 2/2003 |
| JP | 2003-139866 | 5/2003 |
| JP | 2003-185735 | 7/2003 |
| JP | 2004-59320 | 2/2004 |
| JP | 2004-144543 | 5/2004 |
| JP | 2004-286567 | 10/2004 |
| JP | 2005-320074 | 11/2005 |
| JP | 2006-98214 | 4/2006 |
| JP | 2006-313530 | 11/2006 |
| JP | 4868169 | 11/2011 |
| WO | WO 2007/058302 A1 | 5/2007 |

OTHER PUBLICATIONS

Ni, L.M.; Yunhao Liu; Yiu Cho Lau; Patil, A.P.; , "LANDMARC: indoor location sensing using active RFID," Pervasive Computing and Communications, 2003. (PerCom 2003). Proceedings of the First IEEE International Conference on , vol., No., pp. 407-415, Mar. 23-26, 2003.*

Japanese Official Action dated Feb. 29, 2012 from related application JP 2007-545310.

* cited by examiner

FIG. 3

| SET OF ID RECEIVING DEVICE AND ID TRANSMITTING DEVICE | RECEPTION INTENSITY |
|---|---|
| (ID RECEIVING DEVICE 3a, ID TRANSMITTING DEVICE 2a) | 165 |
| (ID RECEIVING DEVICE 3a, ID TRANSMITTING DEVICE 2b) | 200 |
| ⋮ | ⋮ |
| (ID RECEIVING DEVICE 3b, ID TRANSMITTING DEVICE 2a) | 178 |
| (ID RECEIVING DEVICE 3b, ID TRANSMITTING DEVICE 2b) | 154 |
| ⋮ | ⋮ |

FIG. 4

| REFERENCE POSITION | REFERENCE RECEPTION PATTERN |
|---|---|
| (0, 1) | REFERENCE RECEPTION PATTERN 01 |
| (0, 2) | REFERENCE RECEPTION PATTERN 02 |
| ⋮ | ⋮ |
| (1, 1) | REFERENCE RECEPTION PATTERN 11 |
| (1, 2) | REFERENCE RECEPTION PATTERN 12 |
| ⋮ | ⋮ |

FIG. 5

| REFERENCE.POSITION | INTER-PATTERN DISTANCE |
|---|---|
| (0, 1) | 10.5 |
| (0, 2) | 25.0 |
| ⋮ | ⋮ |
| (1, 1) | 3.8 |
| (1, 2) | 4.5 |
| ⋮ | ⋮ |

METHOD OF CALCULATING EUCLID DISTANCE dist BETWEEN TWO VECTORS va AND vb $$va = \begin{pmatrix} va_1 \\ va_2 \\ \vdots \\ va_n \end{pmatrix} \quad vb = \begin{pmatrix} vb_1 \\ vb_2 \\ \vdots \\ vb_n \end{pmatrix}$$

$$dist = \sqrt{\sum_{k=1}^{n} (va_k - vb_k)^2}$$

FIG. 11

$$Bel(x_t) = \alpha_t p(z_t|x_t) Bel^-(x_t)$$

$$Bel^-(x_t) = \int p(x_t|x_{t-1}) Bel(x_{t-1}) dx_{t-1}$$

$t$ : TIME $x_t$ : POSITION OF OBJECT WHEN TIME IS $t$ (HEREINAFTER, REFERRED TO AS POSITION)

$z_t$ : RECEPTION PATTERN GENERATED BY RECEPTION PATTERN GENERATING MEANS WHEN TIME IS $t$ (HEREINAFTER, REFERRED TO AS OBSERVATION QUANTITY)

$Bel(x_t)$ : PROBABILITY THAT OBJECT EXISTS AT POSITION $x_t$ WHEN TIME IS $t$ (HEREINAFTER, REFERRED TO AS POSTERIOR PROBABILITY)

$Bel^-(x_t)$ : PRIMARY PROCESS RESULT (HEREINAFTER, REFERRED TO AS PRIMARY PROCESS RESULT)

$p(z_t|x_t)$ : PROBABILITY THAT OBSERVATION QUANTITY $z_t$ CAN BE OBTAINED WHEN OBJECT EXISTS AT POSITION $x_t$ (HEREINAFTER, REFERRED TO AS PRIOR PROBABILITY)

$p(x_t|x_{t-1})$ : PROBABILITY THAT OBJECT THAT EXISTED AT POSITION $x_{t-1}$ WHEN TIME WAS $t$-1 MIGRATES TO POSITION $x_t$ WHEN TIME IS $t$ (HEREINAFTER, REFERRED TO AS STATUS TRANSITION PROBABILITY)

$\alpha_t$ : NORMALIZATION FACTOR (FACTOR FOR MAKING ADJUSTMENT SO THAT SUM OF POSTERIOR PROBABILITIES BECOMES 1)

$$\alpha_t = \frac{1}{\int \left[ p(z_t|x_t) \int p(x_t|x_{t-1}) Bel(x_{t-1}) dx_{t-1} \right] dx_t}$$

$$p(x_t|x_{t-1}) = \begin{cases} 0 & (b < |x_t - x_{t-1}|) \\ \beta\left(1 + \dfrac{|x_t - x_{t-1}| - a}{b - a}\right) & (a < |x_t - x_{t-1}| \le b) \\ \beta & (|x_t - x_{t-1}| \le a) \end{cases}$$

$a$ : CONSTANT (SEE RIGHT FIGURE)
$b$ : CONSTANT (SEE RIGHT FIGURE)
$\beta$ : NORMALIZATION FACTOR (FACTOR FOR MAKING ADJUSTMENT SO THAT SUM OF STATUS TRANSITION PROBABILITIES BECOMES 1)

$$\beta = \frac{1}{a+b}$$

$$p(z_t | x_t = pos_k) = \begin{cases} 0 & (dist_k \geq dist') \\ 1 - \dfrac{dist_k}{dist'} & (dist_k < dist') \end{cases}$$

$dist_k$ : $k$-TH INTER-PATTERN DISTANCE $dist'$ : INTER-PATTERN DISTANCE CONSTANT

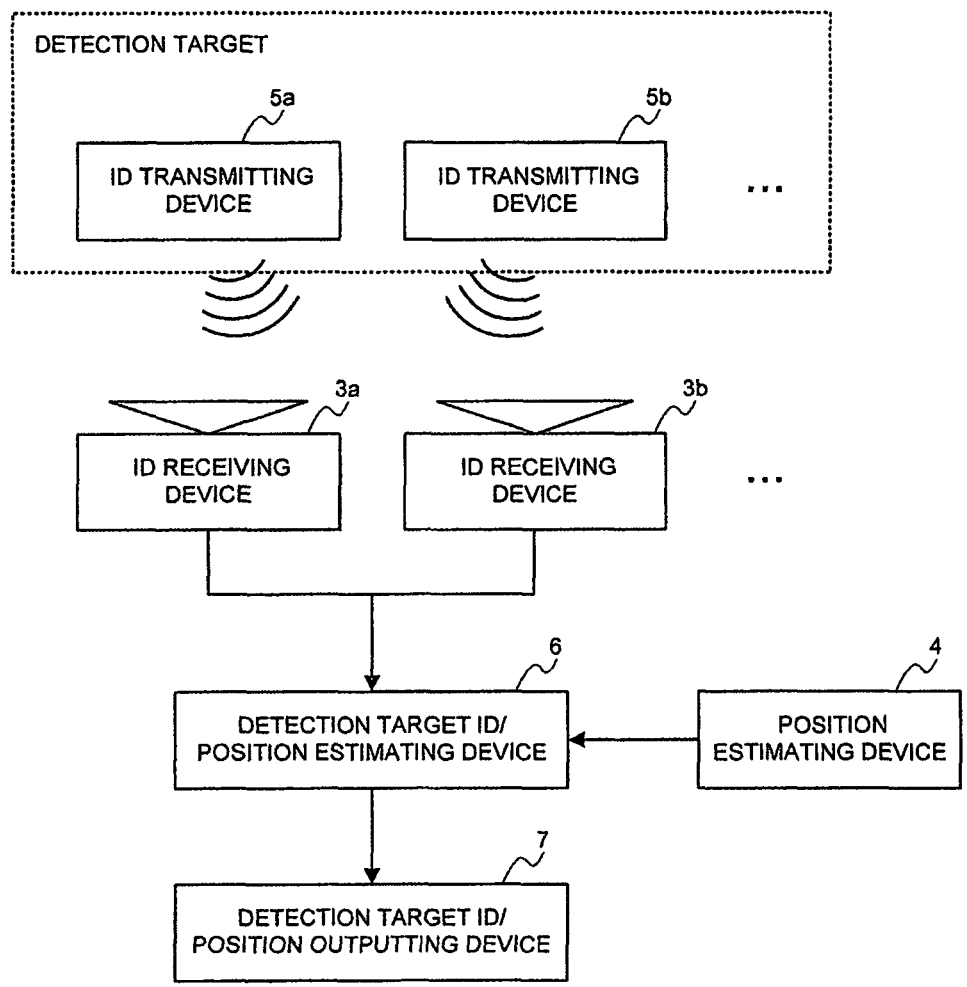

DETECTION TARGET IDENTIFYING/POSITION ESTIMATING SYSTEM, ITS METHOD, AND PROGRAM

APPLICABLE FIELD IN THE INDUSTRY

The present invention relates to a detection target identification/position estimation technology of identifying inherent information of a detection target such as a person and a thing, estimating an existence position of its detection target, and causing the inherent information of the detection target and its existence position to correspond to each other.

BACKGROUND ART

Conventionally, an RFID (Radio Frequency Identification) system, which is configured of a device holding an inherent ID and a device reading off it, has a problem that an erroneous detection and a detection omission occur and resultantly the detection of the ID becomes unstable due to influences such as an antenna directivity of an ID holding device and an ID reading device, an disorder of a radio wave environment caused by a multipath etc., a change in an antenna characteristic caused by a person or a thing to which the ID holding device has been affixed, and radio wave noise from a personal computer located in the adjacent.

So as to reduce the erroneous detection and the detection omission in the RFID system and stabilize the detection, in Patent document 1, a positional relation between the ID holding device and the ID reading device is positively changed, and simultaneously therewith, a plurality of the ID holding devices are prevented from being positionally superposed onto each other, thereby allowing the status in which the radio wave necessary for reading is obtained even in an instant to be created.

Further, in Patent document 2, so as to put a limit to a range in which the detection is made by the ID reading device, providing a shielding plate allows an arrival scope of the radio wave to be limited.

Further, in Patent document 3 and Patent document 4, accommodating the ID holding device in a shell that can be maintained at any time in a state directed to a direction suitable for the reading-off allows the detection to be stabilized.

Further, in Patent document 5, Patent document 6, Patent document 7, Patent document 8, or the like, making an improvement to the device itself of the RFID system, for example, a control of a transmission power, a power supply management, a circuit design for improving a signal-to-noise ratio, and a contrivance of a transmission/reception antenna structure allows the detection to be stabilized.

Further, as a general process of stabilizing the detection, there exists the timeout process of determining that the detection target has left a detection area when the detection target was not be able to be read off for a constant time for a history of a read result, the average value computing process of obtaining an average radio wave intensity in a constant time or a radio ratio in a constant time for a history of a read result, the thresholding process of determining that the detection target has left the detection area when the radio wave intensity or the radio ratio in a constant time has fallen under a constant value, or the like.

Patent document 1: JP-P2002-329174A
Patent document 2: JP-P2004-059320A
Patent document 3: JP-P2003-058843A
Patent document 4: JP-P2002-259932A
Patent document 5: JP-P2002-170082A
Patent document 6: JP-P2001-307052A
Patent document 7: JP-P1999-282977A
Patent document 8: JP-P1998-242893A

DISCLOSURE OF THE INVENTION

Problems to be Solved by the Invention

The first point at issue is that a limit has to be put to a utilization environment or a utilization method so as to stabilize the detection in the RFID system.

The reason is that the conventional RFID system is not capable of completely solving the erroneous detection or the detection omission in all of the multifarious utilization environments or utilization methods, and so as to fully reduce the erroneous detection or the detection omission responding to conditions in a single RFID system, a limit has to be put to the utilization environment or the utilization method.

The second point at issue is that a problem that the detection of the RFID system becomes unstable due to a fluctuation in the utilization environment or the utilization method cannot be solved.

The reason is that even though an improvement to the device itself in the conventional REID system makes it possible to improve the erroneous detection or the detection omission in a certain utilization environment or utilization method, a problem that the detection of the RFID system becomes unstable when its utilization environment or utilization method changes cannot be solved. Further, the method of stabilizing the detection cannot be dynamically altered although a fluctuation in the utilization environment or the utilization method exists, which makes compatibility of stabilization of the detection and time responsiveness or sensitivity of the detection difficult.

The third point at issue is that the conventional REID system is not capable of identifying a position in which the detection target exists, and of detecting a passage etc. of the detection target.

The reason is that a scheme of estimating the position of the detection target is not provided, and further, and a configuration for causing the estimation position of the detection target and the identification information of the detection target to correspond to each other does not exist.

Thereupon, the present invention has been accomplished in consideration of the above-mentioned points at issue, and an object thereof is to provide a technology of estimating an existence position of the detection target, and causing the estimated existence position and detection target identification information for identifying the detection target to correspond to each other, thereby to estimate existence position for each detection target.

The 1st invention for solving the above-mentioned problem, which is a detection target identifying/position estimating system, characterized in comprising the means for: receiving identification information transmitted from a detection-target identification information holding device affixed to or held by a detection target; acquiring a position of said detection target; and causing said received identification information of the detection target and said acquired position of the detection target to correspond to each other.

The 2nd invention for solving the above-mentioned problem, which is a method of identifying a detection target and estimating its position, characterized in comprising the processes of: acquiring a position of said detection target; and causing said acquired position of the detection target and identification information transmitted from a detection-target identification information holding device affixed to or held by said detection target to correspond to each other.

The 3rd invention for solving the above-mentioned problem, which is a program for identifying a detection target and estimating its position, characterized in causing an information processing unit to execute the processes of: acquiring a position of said detection target; and causing said acquired position of the detection target and identification information transmitted from a detection-target identification information holding device affixed to or held by said detection target to correspond to each other.

The 4th invention for solving the above-mentioned problem, which is a detection target identifying/position estimating system, characterized in comprising: a means for receiving detection-target identification information transmitted from a detection-target identification information holding device affixed to or held by a detection target; at least one transmitting device or more being installed in a detection-target area; at least one receiving device or more that is installed in a detection-target area, receives information being transmitted from said one transmitting device or more, and detects a reception feature quantity that is obtained at the time that the detection target exists in a predetermined position of the detection-target area; a means for generating a reception pattern that is obtained at the time that said detection target exists in a predetermined position, based upon said reception feature quantity; a reference reception pattern database in which an existence position of the detection target and a reference reception pattern in the case that the detection target exists in this existence position have been stored correspondingly; a means for comparing said reception pattern with said reference reception pattern, retrieving the existence position corresponding to the reference reception pattern that most approximates said reception pattern from said reference reception pattern database, and estimating an existence position of the detection target from this existence position; and a means for causing said estimated existence position of the detection target and said received detection-target identification information to correspond to each other.

The 5th invention for solving the above-mentioned problem, which is a method of identifying a detection target and estimating its position, characterized in comprising the processes of: receiving detection-target identification information transmitted from a detection-target identification information holding device affixed to or held by a detection target; receiving information being transmitted from one transmitting device or more installed in a detection-target area, and detecting a reception feature quantity that is obtained at the time that the detection target exists in a predetermined position of the detection-target area; generating a reception pattern that is obtained at the time that said detection target exists in a predetermined position, based upon said reception feature quantity; retrieving the existence position corresponding to the reference reception pattern that most approximates said reception pattern from a reference reception pattern database in which an existence position of the detection target and a reference reception pattern in the case that the detection target exists in this existence position have been stored correspondingly, and estimating an existence position of the detection target from this existence position; and causing said estimated existence position of the detection target and said received detection-target identification information to correspond to each other.

The 1st invention for solving the above-mentioned problem, which is a program for identifying a detection target and estimating its position, characterized in causing an information processing unit to execute the processes of: receiving detection-target identification information transmitted from a detection-target identification information holding device affixed to or held by a detection target; receiving information being transmitted from one transmitting device or more installed in a detection-target area, and detecting a reception feature quantity that is obtained at the time that the detection target exists in a predetermined position of the detection-target area; generating a reception pattern that is obtained at the time that said detection target exists in a predetermined position, based upon said reception feature quantity; retrieving the existence position corresponding to the reference reception pattern that most approximates said reception pattern from a reference reception pattern database in which an existence position of the detection target and a reference reception pattern in the case that the detection target exists in this existence position have been stored correspondingly, and estimating an existence position of the detection target from this existence position; and causing said estimated existence position of the detection target and said received detection-target identification information to correspond to each other.

An Advantageous Effect of the Invention

The present invention exhibits an excellent effect that a detection of the detection target is stabilizedly made, the detection target is identified besides, and its existence position as well can be simultaneously acquired.

BRIEF DESCRIPTION OF THE DRAWINGS

FIG. 3 is a view illustrating an example of a reception pattern.

FIG. 4 is a view having one example shown of a text that is stored in a reference reception pattern storing unit 42 in the case that a position of an object is expressed with a two-dimension coordinate.

FIG. 5 is a view illustrating one example of the reception pattern comparison result in the case that a position of the object is expressed with a two-dimension coordinate and an inter-pattern distance is expressed with a one-dimension actual-value.

FIG. 11 is a view having a method shown of calculating a filtering employing a probability inference.

FIG. 15 is a view illustrating a summary of the present invention.

Figure 1:
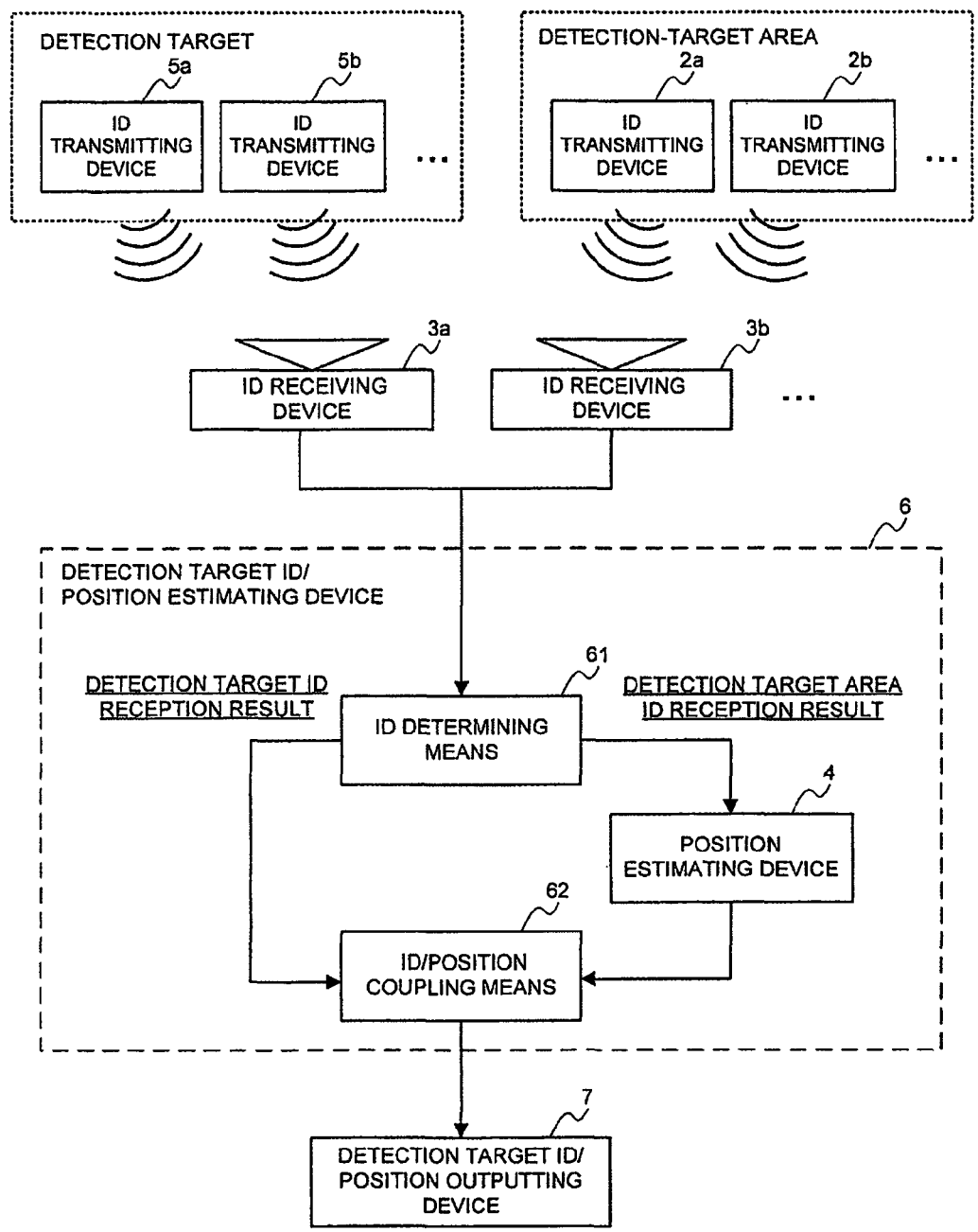
FIG. 1 is a view illustrating a summary of an exemplary embodiment of the present invention.

DESCRIPTION OF NUMERALS 1 detection target
2a detection-target-area ID transmitting device
2b detection-target-area ID transmitting device
3a ID receiving device
3b ID receiving device
4 position estimating device 5a detection-target ID transmitting device
5b detection-target ID transmitting device
6 detection target ID/position estimating device
7 detection target ID/position outputting device

BEST MODE FOR CARRYING OUT THE INVENTION

At first, a summary of the present invention will be explained.

FIG. 15 is a view for explaining a configuration of a summary of the present invention.

As shown in FIG. 15, the present invention includes detection-target ID transmitting devices 5a, 5b, . . . , each of which is affixed to the detection target such as a person and a thing, and transmits an inherent ID (identification information) that it holds with radio communication, ID receiving devices 3a, 3b, . . . , each of which is installed in a detection-target area, and receives the ID being transmitted by each of the detection-target ID transmitting devices 5a, 5b, . . . with radio communication, a position estimating device 4 for estimating a position of the detection target existing in or around the detection-target area, and outputting it, a detection target ID/position estimating device 6 for causing the inherent ID of the detection target and the position of the detection target to correspond to each other, and a detection target ID/position outputting device 7 for outputting a result of the detection target ID/position estimating device 6.

The position estimating device 4 estimates a position of the detection target existing in or around the detection-target area with the estimation of the position of the detection target using a camera, a change in the reception intensity within the detection-target area caused by migration of the detection target, a change in the weight, or the other means.

The detection target ID/position estimating device 6 acquires the inherent ID of the detection target from a reception result of a plurality of the detection-target ID transmitting devices 5a, 5b, . . . . And, it causes the acquired inherent ID and the position estimation result of the detection target input from the position estimating device 4 to corresponds to each other (couples the former to the latter), and outputs the position of the detection target and the inherent ID caused to correspond to each other to the detection target ID/position outputting device 7.

The detection target ID/position outputting device 7 outputs a result in such a form that the position of the detection target and the inherent ID have been caused to correspond to each other.

In such a manner, the present invention outputs the inherent ID of the detection target existing in or around the detection-target area and its existence position correspondingly to each other, thereby making it possible to detect which detection target exits in which position.

Hereinafter, the exemplary embodiment of the present invention having the foregoing summary materialized will be explained.

FIG. 1 is a view for explaining a configuration of the exemplary embodiment of the present invention.

As shown in FIG. 1, this exemplary embodiment includes a plurality of detection-target-area ID transmitting devices 2a, 2b, . . . , each of which is installed in the detection-target area, and transmits an inherent ID that it holds with radio communication, detection-target ID transmitting devices 5a, 5b, . . . , each of which is affixed to the detection target such as a person and a thing, and transmits an inherent ID that it holds with radio communication, ID receiving devices 3a, 3b, . . . , each of which is installed in the detection-target area, receives the IDs being transmitted by a plurality of the ID transmitting devices 2a, 2b, . . . , and the detection-target ID transmitting devices 5a, 5b, . . . with radio communication, receives the inherent IDs from the ID transmitting devices 2a, 2b, . . . , and measures a reception feature quantity with regard to each inherent ID, a detection target ID/position estimating device 6 for causing the inherent ID of the detection target and the position of the detection target to correspond to each other, and a detection target ID/position outputting device 7 for outputting a result of the detection target ID/position estimating device 6.

Each of the ID receiving devices 3a, 3b, . . . receives the inherent IDs being transmitted from the ID transmitting devices 2a, 2b, . . . , and measures a reception feature quantity with regard to each of the received inherent IDs. Herein, the so-called reception feature quantity is at least one of a numerical value indicative of an intensity of the wireless radio wave (hereinafter, referred to as a reception intensity), a numerical value indicative of a quality of the radio communication (for example, a Bit Error Rate, an S/N (an S/N ratio), a C/N (a C/N ratio)) (hereinafter, referred to as a communication quality), and an arrival time of the wireless radio wave or the signal from the ID transmitting device to the ID receiving device (hereinafter, referred to as an arrival time), or a combination thereof.

The detection target ID/position estimating device 6 includes an ID determining means 61, a position estimating device 4, and an ID/position coupling means 62.

The ID determining means 61 determines whether the reception result of the ID transmitting device received by the ID receiving devices 3a, 3b, . . . is a reception result of the detection-target-area ID transmitting devices 2a, 2b, . . . , or a reception result of the detection-target ID transmitting devices 5a, 5b, . . . , and outputs the reception result of the detection-target-area ID transmitting devices 2a, 2b, . . . to the position estimating device 4, and the reception result of the detection-target ID transmitting devices 5a, 5b, . . . to the ID/position coupling means 62, respectively.

The position estimating device 4 estimates and outputs the position of the detection target from the input reception result of the detection-target-area ID transmitting devices 2a, 2b, . . . .

Herein, the details of the position estimating device 4 will be described.

Figure 2:
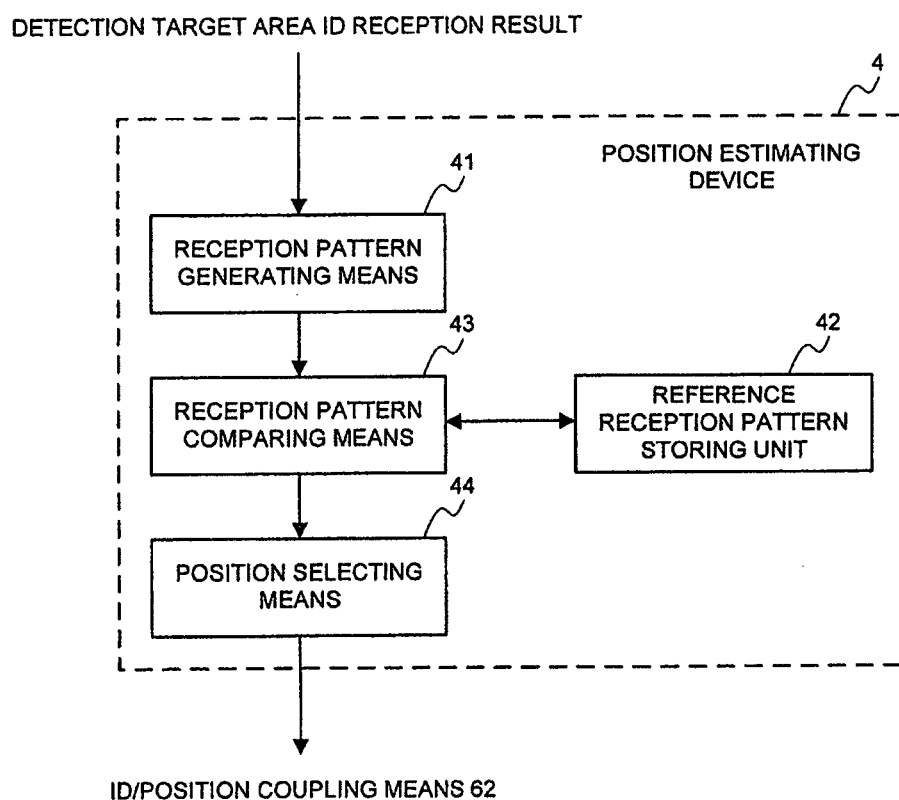
FIG. 2 is a block diagram of a position estimating device.

The position estimating device 4, as shown in FIG. 2, includes a reception pattern generating means 41, a reference reception pattern storing unit 42, a reception pattern comparing means 43, and a position selecting means 44.

The reception pattern generating means 41 generates and outputs a reception pattern from a result of receiving the inherent IDs of the ID transmitting devices 2a, 2b, . . . received by the ID receiving devices 3a, 3b, . . . The reception pattern is expressed with a feature vector having one of reception feature quantities such as the reception intensity, the communication quality, and the arrival time, or a combination thereof as a component for each of all combinations of the ID transmitting devices 2a, 2b, . . . and the ID receiving devices 3a, 3b, . . . For example, the reception pattern is one as shown in FIG. 3 ((ID receiving device 3a, ID transmitting device 2a), (ID receiving device 3a, ID transmitting device 2b), . . . )=(165, 200, . . . ) when the ID receiving devices 3a, 3b, . . . can measure the reception intensity.

The reference reception pattern storing unit 42 pre-stores a plurality of reference reception patterns. The reference reception pattern indicates a reception pattern obtained when the detection target exists at a certain position (hereinafter, referred to as a reference position), and the reference position and the reference reception pattern are stored correspondingly to each other. In FIG. 4, one example is shown of a text that is stored in the reference reception pattern storing unit 42 in the case that a position of the detection target is expressed with a two-dimension coordinate.

The reception pattern comparing means 43 numerizes a difference between the reception pattern generated by reception pattern generating means 41 and each reference reception pattern stored in the reference reception pattern storing unit 42, and outputs a reception pattern comparison result. The reception pattern comparison result is expressed with the reference position that each reference reception pattern has, and an index (hereinafter, referred to as an inter-pattern distance) obtained by numerizing a difference between the reference reception pattern that corresponds to its reference position and the reception pattern. For example, the reception pattern comparison result is expressed as shown in FIG. 5 in the case that the position of the detection target is expressed with a two-dimension coordinate and the inter-pattern distance is expressed with a one-dimension actual-value.

The position selecting means 44 selects and decides a position of the detection target within the target area from the reception pattern comparison result obtained by the reception pattern comparing means 43.

Next, an operation of deciding a position of the detection target will be explained in details by making a reference to FIG. 6.

Figure 6:
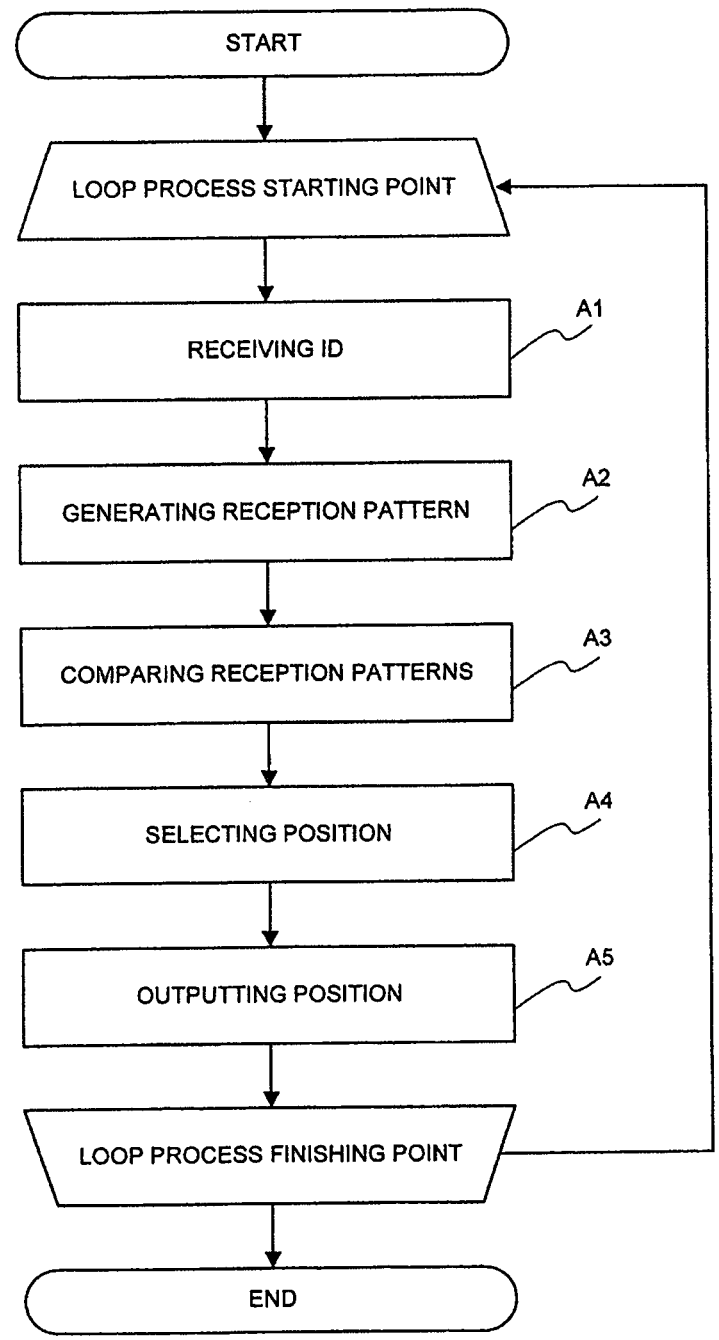
FIG. 6 is a flowchart illustrating an operation of the exemplary embodiment of the present invention.

The IDs transmitted from the ID transmitting devices 2a, 2b, ... are received by the ID receiving devices 3a, 3b, ... with radio communication (step A1 of FIG. 6). The reception pattern generating means 41 generates and outputs a reception pattern from the IDs of the ID transmitting devices 2a, 2b, ... received by the ID receiving devices 3a, 3b, ... and one of the measured reception intensity, communication quality, and arrival time, or a combination thereof (step A2 of FIG. 6).

The reception pattern comparing means 43 calculates an inter-pattern distance between the reception pattern generated by the reception pattern generating means 41 and each of a plurality of the reference reception patterns pre-stored in the reference reception pattern storing unit 42, and outputs a reception pattern comparison result (step A3 of FIG. 6). The position selecting means 44 selects a position of a detection target 1 from the reception pattern comparison result obtained by the reception pattern comparing means 43 (step A4 of FIG. 6). Comparing the reception pattern generated by the reception pattern generating means 41 and each of a plurality of the reference reception patterns pre-stored in the reference reception pattern storing unit 42 makes it possible to estimate a position of the detection target because the reception pattern changes depending upon a position of the detection target.

Figures 7, 8:
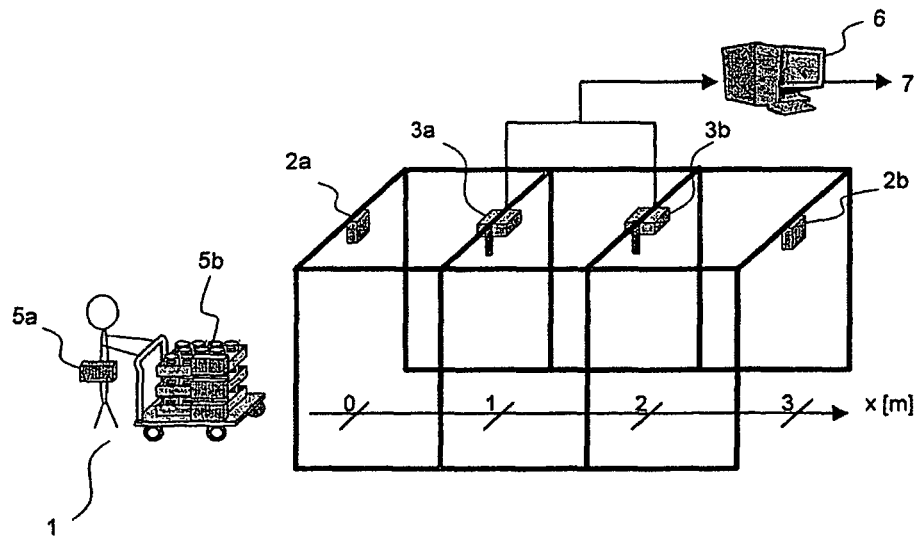
FIG. 7 is a view having a method shown of calculating a Euclid distance between two vectors.
FIG. 8 is a view illustrating a summary of an exemplary example 1 of the present invention.

As a specific example of the reception pattern comparing means 43, there exists the technique of employing a Euclid distance between the feature vector having each reception feature quantity of the reference reception pattern as a component and the feature vector having each reception feature quantity of the reception pattern as a component as an inter-pattern distance between each of a plurality of the reference reception patterns pre-stored in the reference reception pattern storing unit 42 and the reception pattern generated by the reception pattern generating means 41. The method of calculating the Euclid distance between the two vectors is shown in FIG. 7. Further, as a specific example of the position selecting means 44, there exists the technique of selecting the reference position such that the inter-pattern distance is minimized out of the inter-pattern distances of the reception pattern comparison result obtained by the reception pattern comparing means 43 and assuming it to be a position estimation result of the detection target.

The position of the detection target obtained by the position selecting means 44 is output to the ID/position coupling means 62 (step A5 of FIG. 6).

Additionally, so as to enhance a precision at which the foregoing position estimating device 4 estimates the position, the position selecting means 44 may be configured to estimate and output a position estimation result of the object from the reception pattern comparison result output by the reception pattern comparing means 43 with the filtering employing a probability inference (Bayesian Filtering/the reference document: Dieter Fox, Jeffrey Hightower, Lin Liao, Dirk Schulz, and Gaetano Borriello, Bayesian Filtering for Location Estimation, PERVASIVE Computing July-September 2003, pp. 24-33).

Figure 12:
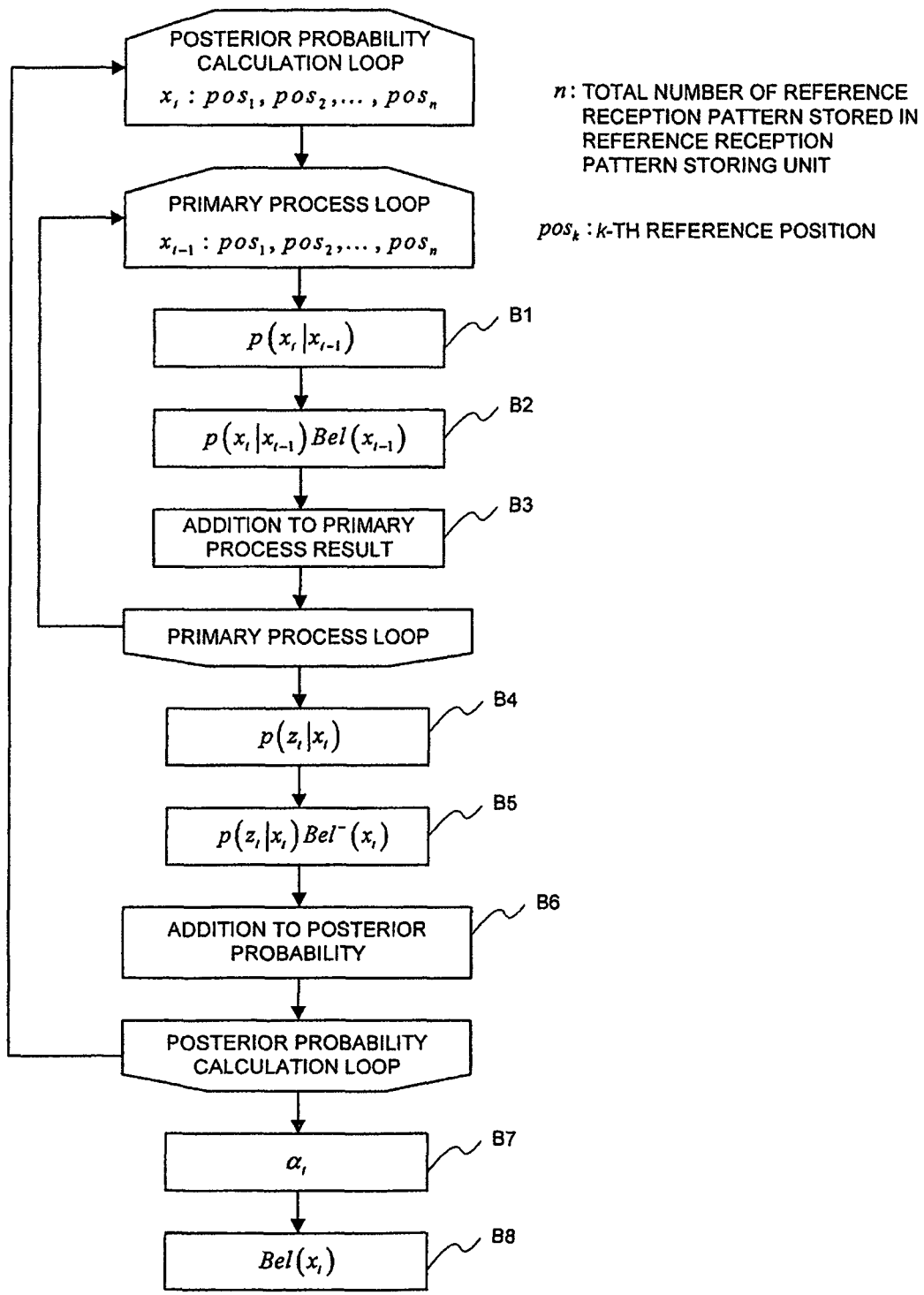
FIG. 12 is an operational flowchart in the case of having employed the filtering employing the probability inference.

The method of calculating the filtering employing the probability inference as mentioned above is shown in FIG. 11, and an operation thereof is shown in FIG. 12. A probability (posterior probability) that the object exists is sequentially computed from the reception pattern comparison result output by the reception pattern comparing means 43 for each of the reference positions of n reference reception patterns pre-stored in the reference reception pattern storing unit 42. The coordinate of the reference position such that the calculated posterior probability becomes maximized is output as a position estimation result.

Figure 13:
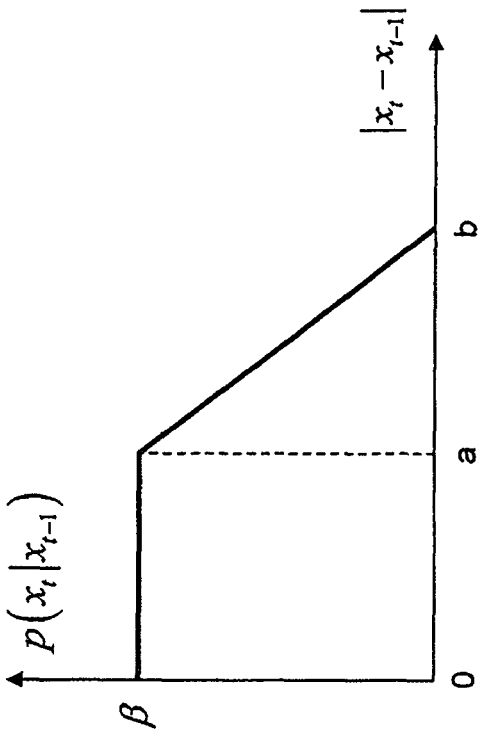
FIG. 13 is a view for explaining an equation of calculating a status transition probability.

In this embodiment, a status transition probability is calculated with a calculation equation shown in FIG. 13 (step B1). The status transition probability calculated like this has such a property of restraining a migration range of the detection target. Two constants a and b in the calculation equation shown in FIG. 13 are decided responding to a migration speed of the detection target. In this exemplary embodiment, a person, who was walking, was envisaged as a detection target, a and b were set to 0.50 m, and 1.0 m, respectively. This is equivalent to putting a limit to the migration speed, i.e. the possibility that the migration speed of a person becomes $1.0 \div 0.5 = 2.0$ m/s or more when an origination time period of the ID transmitting device is 0.5 sec. does not exist. Calculating a product of the status transition probability calculated in the step B1 and a posterior probability ahead of one step (step B2), and thereafter calculating a sum of the total in a primary process loop (step B3) make it possible to obtain a sum of the probabilities (a primary process result) that the object migrates to each reference position from within the target area.

Figure 14:
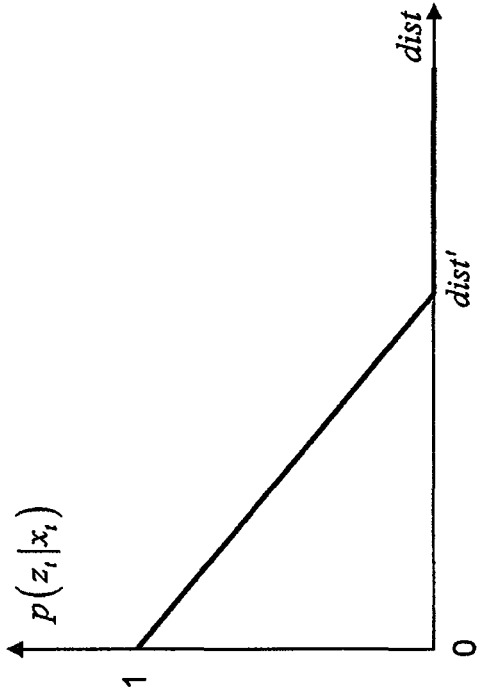
FIG. 14 is a view for explaining an inter-pattern distance constant.

Next, a prior probability is calculated from the comparison result output by the reception pattern comparison means 43 with a calculation equation shown in FIG. 14 (step B4). The prior probability calculated in such a manner is adapted to include a property such that the smaller the inter-pattern distance, the bigger the probability value in the reception pattern comparison result output by the reception pattern comparison means 43. Further, so as to allow the probability value of each of the candidate companions having a small inter-pattern distance to be easily compared with that of the other, from a result of a preliminary experiment that a person, being a detection target, migrates within a tunnel, it is assumed that an average value of the inter-pattern distances that fluctuate is an inter-pattern distance constant shown in FIG. 14. In this exemplary example, the inter-pattern distance constant was set to 50 from the preliminary experiment. Calculating a product (step B5) of the calculated prior probability and the primary process result, thereafter calculating a sum of the total (step B6) in a posterior probability calculation loop, and then normalizing it (step B7) make it possible to obtain the probability (posterior probability) that the object exists in respective reference positions.

Each of the posterior probabilities calculated at respective reference positions is compared with the other, and the coordinate of the reference position, of which the probability value becomes maximized, is output as a position estimation result.

Assuming such a configuration makes it possible to precisely estimate a position of the object by defining a prior probability distribution of the position of the object from the inter-pattern distance, and employing a constraint on the migration of the object established with the status transition probability even when, out of a plurality of the reference reception patterns stored in the reference reception pattern storing unit 42, some of them resemble each other and resultantly an error occurs at the time of attempting to estimate a position of the object only with the inter-pattern distance.

Continuously, the ID/position coupling means 62 will be explained.

The ID/position coupling means 62, as shown in FIG. 1, selects only the ID transmitting devices existing in or around the detection-target area from a reception result of a plurality of the detection-target ID transmitting devices 5*a*, 5*b*, . . . input from the ID determining means 61. In this exemplary embodiment, by establishing a threshold for the reception intensity that can be measured in the ID receiving devices 3*a*, 3*b*, . . . , only the detection-target ID transmitting devices existing in or around the detection-target area are selected. The threshold is established by making a preliminary experiment. In the preliminary experiment, the detection-target ID transmitting device is affixed to a person, being s detection target, and the person is caused to migrate in and outside the detection-target area, the reception intensity being obtained by the ID receiving devices 3*a*, 3*b*, . . . is measured. The appropriate threshold that enables the ID transmitting device existing around the detection-target area to be distinguished from the ID transmitting device existing far way is established from a measurement result of the preliminary experiment. And, when, judging from the position of the detection target estimated by the position estimating device 4, the detection target exists in or around the detection-target area, the inherent ID existing in or around the detection-target area selected as previously mentioned and the position estimation result of the detection target input by the position estimating device 4 are caused to correspond to each other (are coupled), and the position of the detection target and the inherent ID are output to the detection target ID/position outputting device 7.

The detection target ID/position outputting device 7 outputs a result in such a form that the position of the detection target and the inherent ID have been caused to correspond to each other.

AN EXEMPLARY EXAMPLE 1

An exemplary example 1 that corresponds to this exemplary embodiment described above will be explained.

This exemplary example includes an active type RFID tag that employs a button cell as a power source to transmit an inherent ID, which it holds, for each constant time (for example, 0.5 sec.) with radio communication as the detection-target-area ID transmitting devices 2*a* and 2*b*, and the detection-target ID transmitting devices 5*a* and 5*b*, and an RFID reader that receives the IDs from the detection-target-area ID transmitting devices 2*a* and 2*b*, and the detection-target ID transmitting devices 5*a* and 5*b* and is capable of measuring the reception intensity (256-stage integral values ranging 0 to 255) as the ID receiving devices 3*a* and 3*b*.

The detection target ID/position estimating device 6 is realized with a personal computer, and a display is employed as the detection target ID/position outputting device 7. The personal computer includes a central processing unit that functions as the ID determining means 61, the position estimating device 4, and ID/position coupling means 62.

Upon making a reference to FIG. 8, the detection-target-area ID transmitting devices 2*a* and 2*b*, and the ID receiving devices 3*a* and 3*b* in this exemplary example are installed inside a tunnel, and each of the detection-target ID transmitting devices 5*a*, 5*b* is affixed to the detection target 1. The detection target ID/position estimating device 6 estimates a position on an X-axis of the detection target 1 that exists in or around the tunnel, and in addition hereto, couples the inherent ID that the ID transmitting device affixed to the detection target 1 has hereto, and thereafter outputs it. Further, the tunnel is shielded with a radio wave reflector in order to suppress an influence by a fluctuation in the environment outside the tunnel from extending in the tunnel.

The ID determining means 61 determines whether the reception result of the ID transmitting device received by the ID receiving devices 3*a* and 3*b* is a reception result of the detection-target-area ID transmitting devices 2*a* and 2*b*, or a reception result of the detection-target ID transmitting devices 5*a* and 5*b*, and outputs the reception result of the detection-target-area ID transmitting devices 2*a* and 2*b* to the position estimating device 4, and the reception result of the detection-target ID transmitting devices 5*a* and 5*b* to the ID/position coupling means 62, respectively.

The position estimating device 4 estimates and outputs the position of the detection target from the input reception result of the detection-target-area ID transmitting devices 2*a* and 2*b* as described above.

Figure 9:
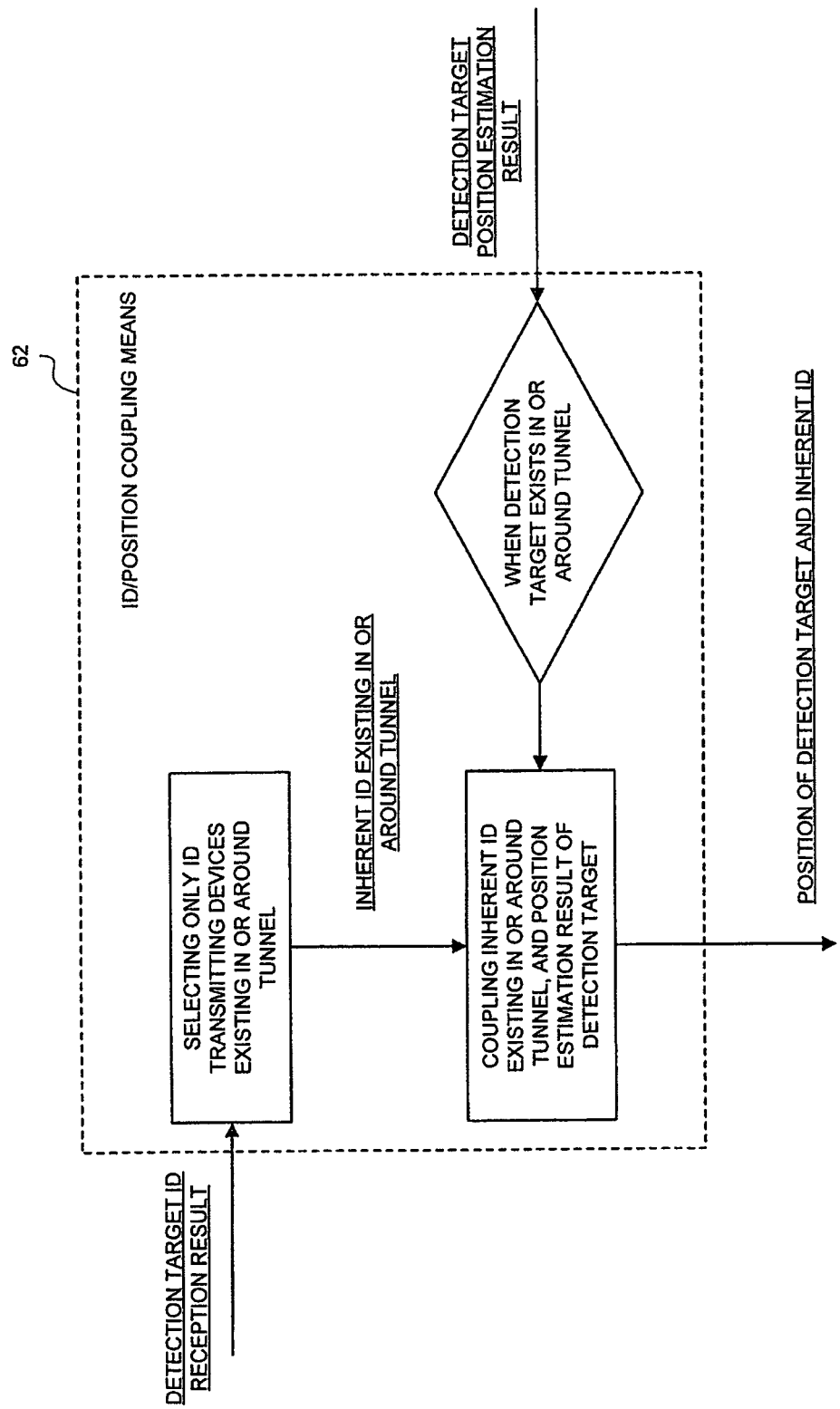
FIG. 9 is a view illustrating an operation of an ID/position coupling means 62 of the exemplary example 1 of the present invention.

The ID/position coupling means 62, as shown in FIG. 9, selects only the ID transmitting devices existing in or around the tunnel from the reception result of a plurality of the detection-target ID transmitting devices 5*a* and 5*b* input by the ID determining means 61.

Figure 10:
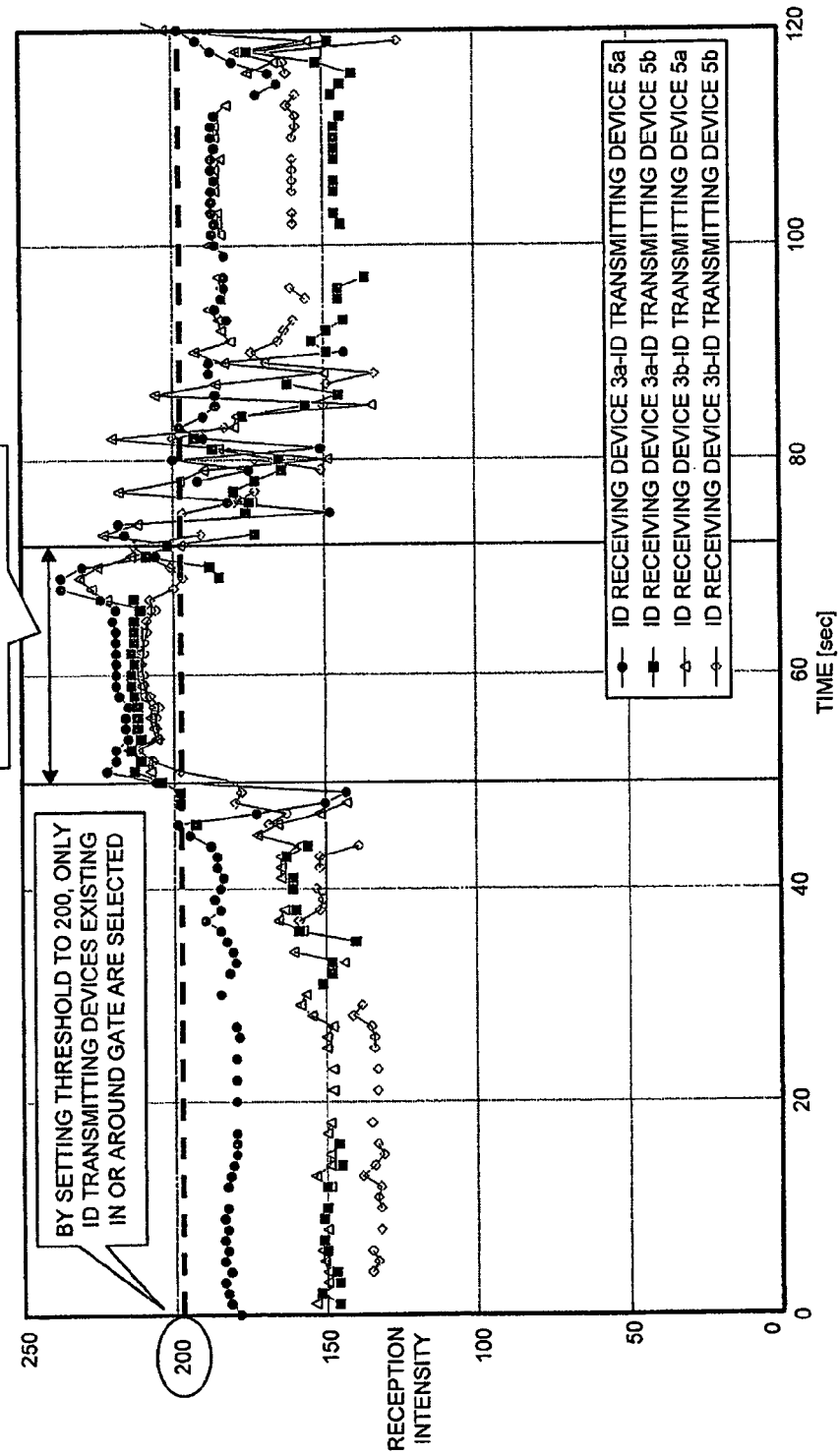
FIG. 10 is a graph illustrating an example of the reception pattern comparison result in the exemplary example 1 of the present invention.

In this exemplary example, by establishing the threshold for the reception intensity that can be measured in the ID receiving devices 3*a* and 3*b*, only the detection-target ID transmitting devices existing in or around the tunnel are selected. The threshold is established by making a preliminary experiment. In the preliminary experiment, the detection-target ID transmitting device is affixed to a person, being s detection target, and the person is caused to migrate in and outside the tunnel, the reception intensity being obtained by the ID receiving device is measured. The appropriate threshold that enables the ID transmitting device existing around the tunnel to be distinguished from the ID transmitting device existing far way is established from a measurement result of the preliminary experiment. In this exemplary example, as indicated in an example of the result of the preliminary experiment shown in FIG. 10, setting the threshold to 200 makes it possible to select only the detection-target ID transmitting devices existing in or around the tunnel. When, judging from the position of the detection target estimated by the position estimating device 4, the detection target exists in or around the tunnel, the inherent ID existing in or around the tunnel that has been selected as mentioned previously, and the position estimation result of the detection target input by the position estimating device 4 are coupled, and the position of the detection target and the inherent ID are output.

In this exemplary example, coupling the position of the detection target estimated by the position estimating device and the inherent ID that the ID transmitting device affixed to the detection target has makes it possible to solve a problem that the inherent ID of the object cannot be specified only with the position estimating device, and further, the position of the object cannot be estimated only both of the ID transmitting device affixed to the object and the ID receiving device installed in the tunnel, and to simultaneously acquire the inherent ID affixed to the object existing in the tunnel and its position.

The invention claimed is:

1. A detection target identifying/position estimating system, comprising:
   at least one area-fixed transmitting device not affixed to a detection target and installed in at least one predetermined position a target area, each area-fixed transmitting device transmitting identification information for determining antecedents of the area-fixed transmitting device, with radio communication;
   at least one detection-target transmitting device affixed to the detection target, each detection-target transmitting device transmitting the identification information for determining antecedents of the at least one detection-target transmitting device, with radio communication;
   at least one receiving device installed in said target area, each receiving device for receiving the identification information transmitted from said at least one area-fixed transmitting device with radio communication to measure a reception intensity thereof; and for receiving the identification information transmitted from said at least one detection-target transmitting device with radio communication;
   a reference pattern database configured to store a reference position for an object within the target area and a reference reception pattern, the reference reception pattern comprising signal intensities received from the at least one area-fixed transmitting device and the at least one detection-target transmitting device, respectively, when the object is located at the reference position, said reference position and the reference reception pattern being correspondingly stored;
   a position estimating means for acquiring a reception pattern comprising the signal intensities received from the at least one area-fixed transmitting device and the at least one detection-target transmitting device, respectively, and for retrieving the reference position which corresponds to the reference pattern acquired, the correspondence being determined by a comparison between a received reception pattern and each reference reception pattern from the reference pattern database and for estimating a position of the detection target within the target area from the retrieved reference position;—and
   an identification information/object position correspondence means that causes the identification information transmitted from the detection-target transmitting device and received by the at least one receiving device, and said estimated position of the object to correspond to each other.

2. The detection target identifying/position estimating system according to claim 1, wherein said identification information/object position correspondence means causes the received identification information of the detection-target transmitting device-of which the reception intensity is larger than a pre-set threshold, to correspond to said estimated position of the object.

3. The detection target identifying/position estimating system according to one of claim 1 and claim 2, wherein the reference pattern database further comprises a reception probability pattern correspondingly stored with the reference position, said reception probability pattern being configured of probabilities by the combinations of said at least one area-fixed transmitting device installed in said target area and said at least one receiving device that the identification information transmitted from said at least one area-fixed transmitting device can be received by said at least one receiving device in the case that the object exists in its position;
   a means for calculating a reception pattern occurrence probability, being an occurrence probability of the reception pattern, from said reception pattern and said reception probability pattern; and
   a position selecting means for estimating a-position of the object from the calculated reception pattern occurrence probability.

4. The detection target identifying/position estimating system according to claim 3, wherein said body position selecting means retrieves the reference position such that said reception pattern occurrence probability is maximized from said reference pattern database, and assumes the retrieved reference position to be the position of the object within the target area.

5. The detection target identifying/position estimating system according to claim 3, wherein said body position selecting means estimates a position of the object from said reception pattern occurrence probability with a filtering employing a probability inference.

6. The detection target identifying/position estimating system according to one of claim 1 and claim 2, wherein the reference pattern database in which a reference position for the object within the target area and the reference reception pattern been stored correspondingly, a reception intensity occurrence probability distribution pattern being configured of occurrence probability distributions of the reception intensities by the combinations of said at least one area-fixed transmitting device installed in said target area and said at least one receiving device in the case that the object exists in its position,
   a means for calculating a reception pattern occurrence probability, being an occurrence probability of the reception pattern, from said reception pattern and said reception intensity occurrence probability distribution pattern; and
   a body position selecting means for estimating a position of the object from the calculated reception pattern occurrence probability.

7. The detection target identifying/position estimating system according to claim 6, wherein said body position selecting means retrieves the reference position such that said reception pattern occurrence probability is maximized from said reference pattern database, and assumes the retrieved reference position to be a position of the object within the target area.

8. The detection target identifying/position estimating system according to claim 6, wherein said body position selecting means estimates a position of the object from said reception pattern occurrence probability with a filtering employing a probability inference.

9. The detection target identifying/position estimating system according to one of claim 1 and claim 2, wherein said position estimating means comprises:
   the reference pattern database; and
   a means for calculating a reception pattern occurrence probability, being an occurrence probability of the reception pattern, from an inter-reception-pattern distance that is obtained by comparing said reception pattern and each of the reference reception patterns from the reference pattern database; and a body position selecting means for estimating a position of the object from the calculated reception pattern occurrence probability.

10. The detection target identifying/position estimating system according to claim 9, wherein said body position selecting means retrieves the reference position such that said reception pattern occurrence probability is maximized from said reference pattern database, and assumes the retrieved reference position to be a position of the object within the target area.

11. The detection target identifying/position estimating system according to claim 9, wherein said body position selecting means estimates a position of the object from said reception pattern occurrence probability with a filtering employing a probability inference.

12. A detection target identifying/position estimating method of identifying a detection target and estimating a position thereof, comprising:

receiving, by at least one receiving device installed in an environment identification, information transmitted from at least one fixed-area transmitting device installed in a target area and acquiring reception intensities thereof;

receiving, by the at least one receiving device, identification information transmitting from a detection-target transmitting device affixed to a detection target;

determining a reception pattern;

estimating a position of an object within the target area based upon a comparison of the determined reception pattern with each of a plurality of reference reception patterns stored in correspondence with a plurality of reference positions, respectively, said estimated position being the reference position that corresponds to the reference reception pattern identified by the comparison; and causing the identification information received from the detection-target transmitting device affixed to said detection target and said estimated position of the object to correspond to each other.

13. A non-transitory computer readable storage medium storing program for identifying a detection target and estimating a position thereof, causing an information processing device to execute:

receiving, by at least one receiving device installed in an environment, identification information transmitted from at least one fixed-area transmitting device installed in a target area and acquiring reception intensities thereof;

receiving, by the at least one receiving device, identification information transmitting from a detection-target transmitting device affixed to a detection target;

determining a reception pattern;

estimating a position of an object within the target area based upon a comparison of the determined reception pattern with each of a plurality of reference reception patterns stored in correspondence with a plurality of reference positions, respectively, said estimated position being the reference position that corresponds to the reference reception pattern identified by the comparison; and causing the identification information received from the detection-target transmitting device affixed to said detection target and said estimated position of the object to correspond to each other.

* * * * *